3,096,267
RADIATION POLYMERIZATION OF VINYL ACETATE

Masakazu Matsumoto and Kiyokazu Imai, Kurashiki, Japan, assignors to Kurashiki Rayon Co., Ltd., Kurashika-shi, Japan, a corporation of Japan
No Drawing. Filed June 3, 1960, Ser. No. 33,619
Claims priority, application Japan June 4, 1959
7 Claims. (Cl. 204—158)

This invention relates to a method for the polymerization of vinyl acetate. More specifically, this invention relates to the subjection of an aqueous solution of vinyl acetate to radioactive rays in order to promote the polymerization of the vinyl acetate monomer.

It is known to polymerize vinyl acetate by heating the vinyl acetate monomer in the presence of a catalyst such as a free radical initiator, for example, the peroxides, particularly benzoyl peroxides or azo compounds such as the symmetrical azonitriles, particularly alpha, alpha'-azobisisobutylonitrile. Where a free radical initiating catalyst is employed to polymerize vinyl acetate, it is necessary to use an elevated temperature, particularly in the initial stages of the polymerization. The temperature at which the polymerization proceeds must be controlled in order to obtain a polymer possessing the desired properties. Further, the polymer prepared in this fashion must be treated to remove the catalyst as well as the products produced by the decomposition of the catalyst from the vinyl acetate polymer.

As is well-known in the art polyvinyl acetate may be saponified to produce polyvinyl alcohol. Polyvinyl alcohol finds many uses, one of which is the formation of fibers. When polyvinyl acetate is polymerized in the conventional manner employing a free radical catalyst, the polyvinyl alcohol produced therefrom possesses a relatively poor crystalline structure. In the present application the term "crystalline structure" or "crystallinity of polyvinyl alcohol" refers to the ability of a polyvinyl alcohol solution to gelatinize. That is, excellent crystalline polyvinyl alcohol refers to the fact that a film made of a gelatinized polyvinyl alcohol has a low degree of swelling in hot water and the emulsification rate of the polyvinyl alcohol solution in dimethyl sulfoxide is high.

It is an object of the present invention to provide a method for polymerizing vinyl acetate whereby the polymerization may be readily controlled and whereby the polyvinyl acetate which is formed may be converted by known means such as by saponification to polyvinyl alcohol possessing an excellent crystalline property.

In accordance with the present invention, vinyl acetate is polymerized by subjecting a solvent solution of the vinyl acetate monomer to a high energy radioactive radiation source for a period of time sufficient to effect the desired polymerization.

The high energy radioactive radiation may be supplied by any well-known means. Examples are the radioactive rays emitted from natural or artificial radioactive substances such as the gamma rays of cobalt 60 which are emitted from the radioactive substances generated through nuclear fission, the electro-magnetic waves generated by various means, corpuscular beams produced through various processes, for example, neutron beams, hydrogen ion beams, heavy hydrogen ion beams, electron beams, X-rays, and the radioactive rays of various origins inside an atomic pile. The radiation time and intensity depends largely upon the degree of polymerization desired for the polymer. The range of time for the subjection of the vinyl acetate monomer solution to the ionized radioactive rays may vary from a few minutes to about 24 hours. The intensity of the radiation which is suitable for polymerizing vinyl acetate may vary from about $1 \times 10^3$ roentgens per hour to about $1 \times 10^6$ roentgens per hour.

It is also possible to employ the standard polymerization initiators such as the peroxides and azo compounds along with the ionizing radioactive rays. Where the polymerization catalysts are employed with the radioactive rays, the efficiency of the polymerization is increased.

It has been surprisingly found that where the vinyl acetate monomer to be polymerized by the use of radioactive rays is placed in a mixed solvent comprised of water and a water-soluble solvent, the rate of polymerization is vastly superior to the rate of polymerization in a solvent free from water. Accordingly, when the polymerization of vinyl acetate as practiced by the present method wherein the vinyl acetate to be polymerized by the radioactive rays is placed in a mixed solvent containing water and a water-soluble solvent, two advantages are obtained over polymerization in a hydrous solvent. First, the rate of polymerization with the same dosage of radioactive rays is greater and second, the polyvinyl alcohol obtained from the polyvinyl acetate possesses more desirable crystalline properties.

In practicing the present invention the quantity of mixed solvent consisting of water and a water-soluble solvent in weight percent based on the weight of vinyl acetate may vary from about 10 to about 200 percent. The water should comprise at least 10 percent and not more than about 90 percent of the mixed solvent with the water-soluble solvent consisting of from 90 to 10 percent of the mixed solvent. The solvents which may be employed in the present polymerization are those which are excellent in mutual solubilities with water such as the lower alcohols, particularly methanol, ethanol, and propanol and compounds such as acetic acid, methyl acetate, methyl formate, and ethyl formate. It has been found that the degree of polymerization is not appreciably affected even when the viscosity of the monomer is lowered by increasing the dilution with the addition of substantial amounts of water.

The polymerization of vinyl acetate with ionizing radioactive rays may be conducted at arbitrarily chosen temperatures. It has been found that where the polymerization is conducted at temperatures of room temperature or slightly below, a polyvinyl acetate is formed which may be converted to a polyvinyl alcohol having excellent crystalline properties. The present invention is further illustrated by the following examples of a preferred embodiment of the invention.

Example 1

Sample A, 50 parts of vinyl acetate and 50 parts of methanol were polymerized in a closed tube at a temperature of 30–35° C. for a period of 2.2 hours by applying gamma rays of cobalt 60 with the dosage of $4.45 \times 10^4$ roentgens per hour.

Sample B, 50 parts of vinyl acetate and 50 parts of a mixed solvent comprised of 40 percent water and 60 percent methanol were polymerized under the same conditions as Sample A. The results of the polymerization of Samples A and B are shown in the following table:

| Sample | Rate of Polymerization (Percent) | Degree of Polymerization of Polyvinyl Acetate | Degree of Polymerization of Polyvinyl Alcohol |
|---|---|---|---|
| A | <1 | | |
| B | 69.3 | 1,830 | 1,600 |

As is clearly indicated from the above table, the rate of polymerization where hydrous methanol (Sample B) is employed is vastly superior to that in anhydrous methanol (Sample A). The film of polyvinyl alcohol which was obtained through the usual saponification of polyvinyl acetate polymerized in hydrous methanol (Sample B) possessed a smaller degree of swelling and a more desirable crystalline property when compared with films made from polyvinyl alcohols prepared from polyvinyl acetate which was polymerized in the conventional manner.

*Example 2*

Sample A, 50 parts of vinyl acetate and 50 parts of acetic acid were polymerized in a closed tube at a temperature of 30–35° C. for a period of 2.2 hours applying gamma rays of cobalt 60 in a dosage of $4.45 \times 10^4$ roentgens per hour.

Sample B, 50 parts of vinyl acetate and 50 parts of a mixed solvent consisting of 40 percent water and 60 percent acetic acid were polymerized in the same manner as Sample A. The rate of polymerization in anhydrous acetic acid (Sample A) was 44 percent while the rate of polymerization in hydrous acetic acid (Sample B) was 66 percent.

We claim:

1. A method for the polymerization of vinyl acetate which comprises forming a solution consisting of vinyl acetate monomer, and 10 to 200 percent of a solvent based on the weight of vinyl acetate monomer, said solvent consisting of 10 to 90 percent of water by weight and 90 to 10 percent of a water-soluble solvent by weight, and subjecting said vinyl acetate solution to high energy, ionizing radiation, the dosage of said radiation being at least about $1 \times 10^3$ roentgens per hour.

2. A method for the polymerization of vinyl acetate which comprises forming a solution consisting of vinyl acetate monomer and 10 to 200 percent of a solvent based on the weight of vinyl acetate monomer, said solvent consisting of 10 to 90 percent of water by weight and 90 to 10 percent of a water soluble-solvent by weight and subjecting said vinyl acetate solution to gamma radiation, the dosage of said radiation being at least about $1 \times 10^3$ roentgens per hour.

3. A method for the polymerization of vinyl acetate which comprises forming a solution consisting of vinyl acetate monomer and 10 to 200 percent of a solvent based on the weight of vinyl acetate monomer, said solvent consisting of 10 to 90 percent of water by weight and 90 to 10 percent of a water-soluble solvent by weight and subjecting said vinyl acetate solution to gamma radiation in the range of $1 \times 10^3$ and $1 \times 10^6$ roentgens per hour for a time sufficient to polymerize the vinyl acetate monomer.

4. A method for the polymerization of vinyl acetate which comprises forming a solution comprising a vinyl acetate monomer and a hydrous solvent for said monomer, said solvent comprising 10 to 90 percent of water by weight, and subjecting said vinyl acetate solution to high energy, ionizing radiation in the range of about $1 \times 10^3$ and about $1 \times 10^6$ roentgens per hour for a time sufficient to polymerize the vinyl acetate monomer.

5. A method for the polymerization of vinyl acetate as defined in claim 4, wherein said radiation is gamma radiation.

6. A method for the polymerization of vinyl acetate which comprises forming a solution comprising vinyl acetate monomer and 10 to 200 percent of a solvent based on the weight of vinyl acetate monomer, said solvent comprising 10 to 90 percent of water by weight and 90 to 10 percent of a water-soluble solvent by weight, and subjecting said vinyl acetate solution to high energy, ionizing radiation in the range of about $1 \times 10^3$ and about $1 \times 10^6$ roentgens per hour for a time sufficient to polymerize the vinyl acetate monomer.

7. A method for the polymerization of vinyl acetate which comprises forming a solution comprising vinyl acetate monomer and a hydrous solvent for said monomer, said solvent comprising 10 to 90 percent of water by weight, and subjecting said vinyl acetate solution to high energy, ionizing radiation, the dosage of said radiation being at least about $1 \times 10^3$ roentgens per hour.

References Cited in the file of this patent

Medvedev: Journal Chemie Physique, vol. 52 (1955), pages 677–688.